No. 746,288. Patented December 8, 1903.

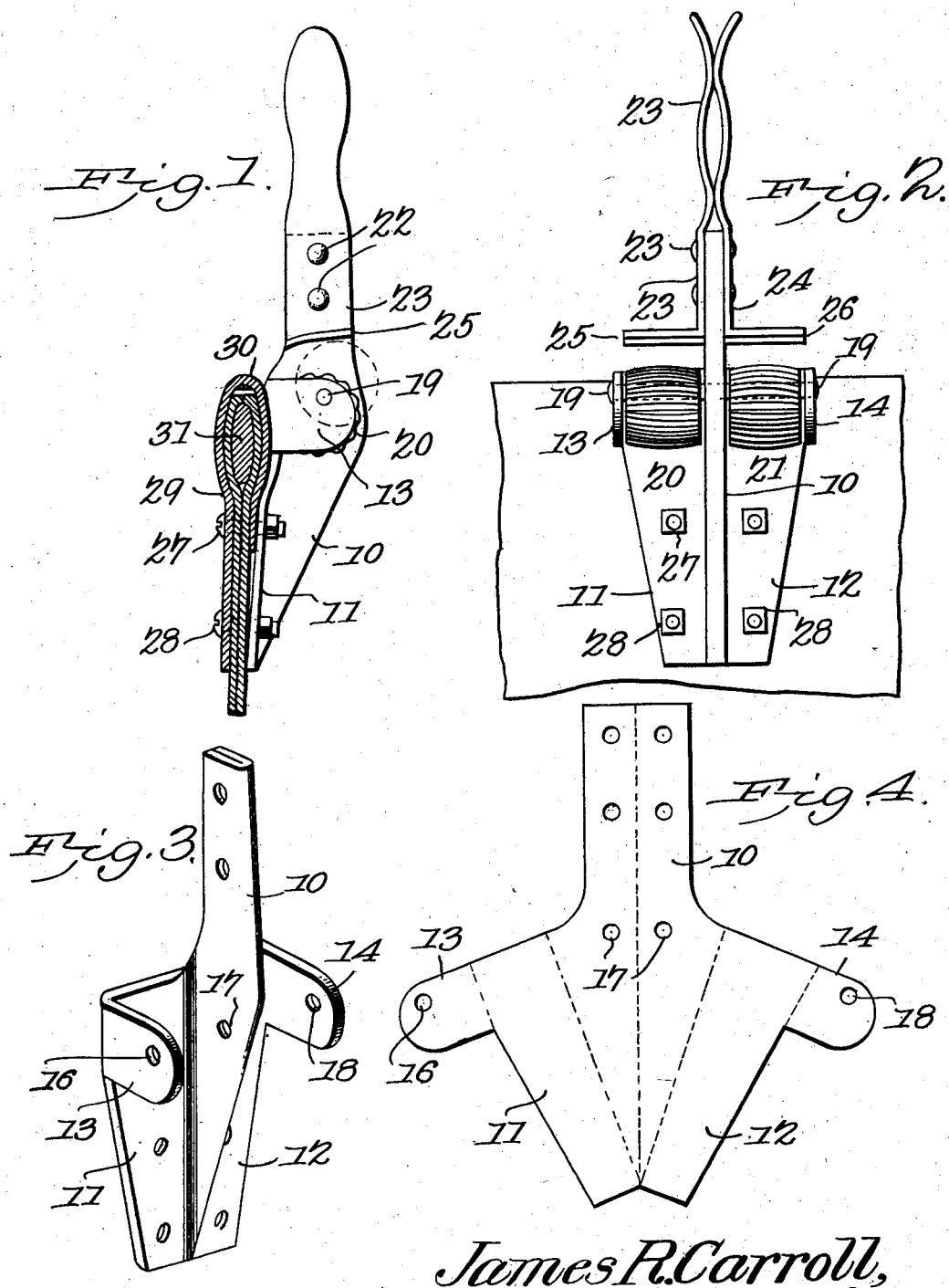

UNITED STATES PATENT OFFICE.

JAMES R. CARROLL, OF McCALL, LOUISIANA.

REIN-HOLDER.

SPECIFICATION forming part of Letters Patent No. 746,288, dated December 8, 1903.

Application filed October 27, 1903. Serial No. 178,767. (No model.)

*To all whom it may concern:*

Be it known that I, JAMES R. CARROLL, a citizen of the United States, residing at McCall, Ascension parish, and State of Louisiana, have invented a new and useful Rein-Holder, of which the following is a specification.

This invention relates to rein-holding devices for attachment to vehicles for holding the driving-reins when not in use, and has for its object to simplify and improve devices of this class and reduce the cost of manufacture and the number of parts required, at the same time increasing the efficiency.

The invention consists in certain novel features of construction, as hereinafter shown and described, and specified in the claims.

In the drawings illustrative of the invention, in which corresponding parts are denoted by like designating characters, Figure 1 is a side elevation, and Fig. 2 is a rear elevation, from the driver's side of the device applied. Fig. 3 is a perspective view of the base member detached. Fig. 4 represents the blank from which the base member is "struck up."

The improved device is preferably attached to the dashboard of the vehicle; but it may be attached to other parts, if preferred, or to any part of the body or seat, and I do not, therefore, desire to be limited in the use of the device upon any specific part of the vehicle or to any specific form of vehicle.

The device is especially applicable to vehicles having dashboards of the usual form and for the purpose of illustration is shown thus applied.

The improved device consists of a foundation or base member, preferably formed of a single sheet of steel or other metal cut in blank, as shown in Fig. 4, and folded together and pressed to form a central rib 10 and then bent laterally in opposite directions, as at 11 12, to form the foundation portion and provided with ears 13 14, bent at right angles to the portions 11 12 and disposed parallel to and spaced from the central rib 10, as shown. The ears 13 14 and the rib 10 are provided with alined apertures 16 17 18 to receive a pivot-pin 19, which supports two eccentrically-mounted rollers 20 21 between the ears 13 14 and the central rib 10, as shown. The central rib 10 projects beyond the base portions 11 12, and riveted, as at 22, to opposite sides of this extension of the rib are clamp-plates 23 24, between the free ends of which the reins may be held when a light support only is required. The ends 25 26 of the plates 23 24 are turned outward over the rollers 20 21, as shown, to form guards against which the rollers 20 21 bear when rotated in one direction. The faces of the guard portions 25 26 adjacent the rollers are preferably concaved to conform to the surfaces of the rollers to increase the "grip" between them.

The foundation portions 11 12 are designed to be attached to the vehicle, as by bolts 27 28, and when thus attached and the reins inserted between the rollers 20 21 and the guards 25 26 and strain applied the eccentric form of the rollers will exert a strong grip upon the reins and press them firmly against the guard-plates and effectually lock them to the vehicle, preventing their removal when pulled in a forward direction, and which are easily releasable by the driver by a slight rearward pull thereon. When a support only is required for the reins, the grip of the resilient bars 23 24 will be sufficient to hold them. When applied to a dashboard, a clamp-plate 29 is preferably employed exteriorly of the dashboard opposite the foundation portions and with its upper rim 30 folded over the binding portion 31 of the dashboard and all three parts secured together by the bolts 27 28. By this means the strains are distributed over a comparatively large area of the dashboard and the tendency to injure the dashboard obviated.

The members 23 24 will be of relatively heavy spring-steel to afford the requisite grip, and the remaining parts will likewise be of steel and may be plated, japanned, or otherwise coated or protected, as required.

Having thus described the invention, what I claim is—

1. A rein-holder comprising a supporting-base for attachment to a vehicle, said base provided with a central longitudinal rib and spaced laterally-extending ears, oppositely-disposed guard-plates extending laterally from said central rib beyond said ears, and rollers mounted eccentrically between said ears and bearing against said guard-plates.

2. A rein-holder comprising a supporting-base for engagement with one face of a dashboard and having a central longitudinally-extending rib and spaced laterally-extending ears, a clamp-plate having a depending lip for engagement with the rim of the dashboard and engaging the opposite face of the dashboard from said supporting-base, binding-bolts connecting said plates through the dashboard, oppositely-disposed guard-plates extending laterally from said central rib beyond said ears, and rollers mounted eccentrically between said ears and bearing against said guard-plates.

3. A rein-holder comprising a supporting-base for attachment to a vehicle, said base provided with a central longitudinal rib projecting beyond the base portion, and provided with spaced lateral ears, oppositely-disposed guard-plates extending laterally from said rib extension beyond said ears, and rollers eccentrically mounted between said ears and bearing against said guard-plates.

4. A rein-holder comprising a supporting-base for attachment to a vehicle, said base provided with a central longitudinal rib projecting beyond the base portion, and provided with spaced lateral ears, oppositely-disposed guard-plates extending laterally from said rib extension beyond said ears, and having projecting spaced resilient rein-grip plates, and rollers eccentrically mounted between said ears and bearing against said guard-plates.

5. In a rein-holder a supporting-base formed from a single sheet of metal folded together to form a central rib and then bent laterally in opposite direction to form the foundation and provided with integral ears bent at right angles to the foundation portion, guard-plates extending laterally from said central rib, and rollers eccentrically mounted between said ears and central rib and bearing against said guard-plates.

In testimony that I claim the foregoing as my own I have hereto affixed my signature in the presence of two witnesses.

JAMES R. CARROLL.

Witnesses:
  I. A. MELANCON,
  WALTER LEMANN.